(12) United States Patent
Dinh et al.

(10) Patent No.: US 7,928,182 B2
(45) Date of Patent: Apr. 19, 2011

(54) GLYCEROL POLYCARBONATE, ORGANIC COMPOSITIONS CONTAINING SAME AND METHOD FOR OBTAINING SAID COMPOSITIONS

(75) Inventors: Nguyen T. Dinh, Saint Laurent D'agny (FR); Zéphirin Mouloungui, Toulouse (FR); Philippe Marechal, Toulouse (FR)

(73) Assignees: Condat S.A., Chasse sur Rhone (FR); INRA (Institut National de Recherche Agronomique), Paris (FR); INPT (Institut National Polytechnique de Toulouse), BP (FR)

( * ) Notice: Subject to any disclaimer, the term of this patent is extended or adjusted under 35 U.S.C. 154(b) by 444 days.

(21) Appl. No.: 11/573,528

(22) PCT Filed: Aug. 10, 2005

(86) PCT No.: PCT/FR2005/002065
§ 371 (c)(1), (2), (4) Date: Nov. 3, 2008

(87) PCT Pub. No.: WO2006/021676
PCT Pub. Date: Mar. 2, 2006

(65) Prior Publication Data
US 2009/0054271 A1 Feb. 26, 2009

(30) Foreign Application Priority Data
Aug. 10, 2004 (FR) ..................... 04 08796

(51) Int. Cl.
*C08G 63/00* (2006.01)
*C08G 63/02* (2006.01)
(52) U.S. Cl. ............ 528/370; 174/125.1; 505/230; 505/233; 507/117; 528/196; 528/198; 528/296
(58) Field of Classification Search .............. 174/125.1; 505/230, 233; 507/117; 528/196, 198, 296
See application file for complete search history.

(56) References Cited

U.S. PATENT DOCUMENTS

| 2,915,529 | A | | 12/1959 | Bell et al. |
| 3,689,462 | A | | 9/1972 | Maximovich |
| 3,896,090 | A | | 7/1975 | Maximovich et al. |
| 5,721,305 | A | * | 2/1998 | Eshuis et al. ............ 524/442 |
| 2009/0036642 | A1 | * | 2/2009 | Truong Dinh et al. ....... 528/296 |

FOREIGN PATENT DOCUMENTS

| EP | 0739888 | 10/1996 |
| FR | 1182439 | 6/1959 |
| FR | 2778182 | 11/1999 |

OTHER PUBLICATIONS

Polymer Letter, vol. 14 p. 161-165 (1971).
Makromol. Chem 191, 465-472 (1990).

* cited by examiner

*Primary Examiner* — Terressa M Boykin
(74) *Attorney, Agent, or Firm* — Baker Donelson; Bearman, Caldwell & Berkowitz, PC

(57) ABSTRACT

An organic composition including
a) a glycerol polycarbonate of the formula:

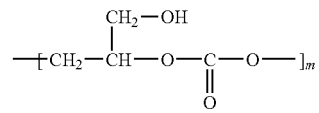

in which m is equal to at least 2, and has a value from 2 to 100;
b) a glycerol of formula:

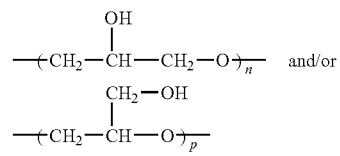

in which n and p are each equal to at least 2, each having a value from 2 to 150; and
c) a [(α-hydroxymethyl) oxyethylene (α-hydroxymethyl) ethylene carbonate)] copolymer of the formula:

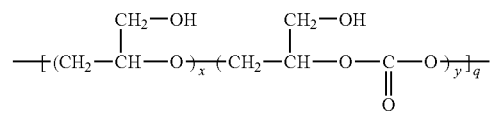

in which x is equal to at least 2 and has a value between 2 and 100, y is equal to at least 2 and has a value between 2 and 100 and q is equal to at least 2 and has a value between 2 and 100.

40 Claims, No Drawings

US 7,928,182 B2

GLYCEROL POLYCARBONATE, ORGANIC COMPOSITIONS CONTAINING SAME AND METHOD FOR OBTAINING SAID COMPOSITIONS

CROSS REFERENCE TO RELATED APPLICATIONS

This application is a National Stage Application of International Application No. PCT/FR05/002065 filed Aug. 10, 2005, which claims priority to French Application No. 0408796 filed Aug. 10, 2004.

BACKGROUND OF THE INVENTION

1. Field of the Invention

This invention relates to an organic compositions consisting at least in part of glycerol polycarbonates.

The invention relates to glycerol polycarbonate extracted from the organic composition.

The invention also relates to the organic composition including glycerol polycarbonates, in a mixture with polyglycerols, [(α-hydroxymethyl)oxyethylene/(α-hydroxymethyl ethylene carbonate) copolymers; optionally [(α-alkyl) oxyethylene/(α-alkyl)ethylene carbonate] copolymers, optionally [(α-alkyl)oxyethylene/(α-hydroxyalkyl)oxyethylene] copolymers, glycerol carbonate and/or other organic carbonates, glycerol and/or other co-produced and/or residual compounds.

The invention also relates to a method for producing the organic composition, by catalytic polymerisation in a heterogeneous reaction medium comprising an organic liquid phase made up of at least one compound providing hydroxyl functions and at least one compound providing carbonate functions, a solid phase that may or may not be solubilised formed by a catalyst containing active sites in the Lewis or Bronsted sense and an ambient gaseous phase formed by gas products in situ.

The invention also relates to a method for the separation extraction of each constituent of the organic composition, and, in particular, for the extraction of the glycerol polycarbonate, or polyglycerol or [(α-hydroxymethyl)oxyethylene/(α-hydroxymethyl)ethylene carbonate] copolymers or [(α-alkyl)oxyethylene/(α-alkyl)ethylene carbonate] copolymers, or [(α-alkyl)oxyethylene/(α-hydroxyalkyl)oxyethylene] copolymers.

The invention finally relates to the use and application, in numerous fields, of the organic composition, or of each of its extracted constituents, owing to the numerous specific characteristics such as tribological multifunctionality, non-toxicity to humans, animals and the environment, biodegradability, thermal stability, resistance to oxidation and hydrolysis, high wettability, rheological properties, electrical conductivity, hydrophilic and water-soluble characteristics, and so on. Without being exhaustive, it is possible to cite fields such as motor vehicle and industrial lubricants and lubricating additives, more specifically those intended for metal working or machining, hydraulic fluids, more specifically fire-resistant, as additives, mould-release agents, wood treatment products, additives for drilling mud, detergency, wetting additives, thickeners and dispersing agents, pharmacy, cosmetics, food, and so on, and finally as chemical synthesis intermediates.

2. Description of Related Art

It is known that glycerol is an organic compound produced in large amounts in industrial-scale transformations of oils and grease into soaps, fatty acids, fatty esters and in particular, fatty acid methyl esters. The latter is produced for the development of biofuels.

Glycerol therefore appears to be an available starting material of interest due to its low cost and intrinsic qualities.

This is why much research and development, focusing on the processing of glycerol as is, or, preferably, in a chemically transformed state, has been conducted.

One of the chosen methods for this transformation is heterocyclisation of the glycerol, which enables it to be transformed into glycerol carbonate with a greater added value in view of the applications in which glycerol carbonate has been shown to be effective owing to its excellent intrinsic characteristics. Glycerol carbonate is indeed a compound that is:

bi-functional, enabling it to act as a solvent with regard to numerous organic or inorganic compounds, non-toxic with a high boiling point, capable of being used as a polymer stabilisation additive and synthesis intermediate in organic reactions such as esterifications, transesterifications, carbamoylation and other reactions, capable of being implemented in numerous fields such as cosmetics, pharmacy and food.

A number of methods for performing the heterocyclisation of glycerol by carbonation are proposed in the prior art, all showing the benefits of said heterocylisation.

A first document (U.S. Pat. No. 2,915,529) describes a method for synthesis of glycerol carbonate, by reacting glycerol with an organic carbonate, such as ethylene carbonate or propylene carbonate in a homogenous catalyst, in the presence of an alkaline base, at a temperature of between 125° C. and 135° C. The reaction medium gives, at the end of the reaction, a mixture made up of glycerol carbonate, ethyleneglycol, an alkaline base used as the catalyst, glycerol and ethylene carbonate. But the extraction of the glycerol carbonate from the aforementioned reaction medium obtained, creates a major disadvantage because this extraction is difficult to implement: it indeed requires an acid neutralisation followed by a vacuum distillation in the presence of glycerol contaminated by the products resulting from the neutralisation. In addition, this method developed on an industrial scale has another disadvantage, which is the implementation, as a carbonate source for the reaction, a costly reagent: organic carbonates. Finally, this method leads solely to the production of glycerol carbonate.

Another document (EP 0739888) describes a method for producing glycerol carbonate from glycerol and cyclic organic carbonate, by reacting these compounds in a solvent medium constituted by an organic carbonate or a mixture of organic carbonates, in the presence of a solid catalyst including a bicarbonated or hydroxylated anionic macroporous resin, or an X or Y three-dimensional zeolite comprising basic sites, at a temperature of no more than 110° C. In this method, the ethylene and/or propylene carbonates are preferably used as reactive starting carbonates because they produce higher reaction kinetics, and the co-product of the carbonation reaction, which is a diol, is drawn off of the reaction medium as it forms.

By combining the aforementioned means, in particular by combining the reaction in a solvent medium formed by organic carbonates, containing a heterogeneous catalyst and removing the diol formed, the method makes it possible to obtain almost exclusively highly-concentrated glycerol carbonate without organic polycarbonates appearing in the reaction medium.

Another document (FR 2 778 182) describes a method for producing glycerol carbonate by a carbamoylation/carbonation catalytic reaction of glycerol, which consists of reacting urea and glycerol at a temperature of between 90° C. and 220° C. in the presence of a catalyst, constituted by at least one metal salt containing Lewis acid sites.

This reaction is produced by the following two-step mechanism:

Urea+glycerol->glycerol carbamate+ammonia (1)

Glycerol carbamate->glycerol carbonate+ammonia (2)

The reaction, according to the two aforementioned steps, is preferably performed under vacuum, in particular at a pressure of between $3.10^3$ Pa and $2.10^4$ Pa, so as to move the reaction medium in order to eliminate the ammonia gas generated.

The catalyst implemented in the method described is chosen from the group constituted by metal sulphates, such as zinc sulphate, manganese sulphate, magnesium sulphate, nickel sulphate, iron sulphate, cobalt sulphate, sodium sulphate, having Lewis acid sites, with the catalytic activity: these metal sulphates are implemented alone or in supported forms.

The method proposed for producing glycerol carbonate by a catalytic reaction of two compounds, which are glycerol and urea, is thus more economically advantageous and therefore industrially applicable owing to the low costs of the starting materials used. But the method is limited exclusively to the production of glycerol carbonate.

Thus, the prior art already shows that it is known how to produce glycerol carbonate, just as it was known how to produce other organic carbonates such as ethylene carbonate.

However, the prior art also shows that some of these organic carbonates, such as, in particular, ethylene carbonate, were capable of being transformed into macromolecular polycarbonates, which are particularly advantageous in many areas of chemical applications.

A document (FR 1 182 439) actually describes a method for preparing macromolecular polycarbonates from cyclic carbonates (such as ethylene carbonate) with terminal hydroxyls, with molecular weights of between 700 g/mol and 5000 g/mol and presenting hydroxyl indices ranging from 20 to 170.

The method proposed consists of heating the ethylene carbonate with a polyhydric alcohol to temperatures of between 150° C. and 250° C. in the presence of a basic catalyst (potassium carbonate) with a $CO_2$ emission. The ethylene polycarbonates resulting from this method have advantageous properties due to the presence of their numerous hydroxyl sites, which enable them to react, for example, with carboxylic acids, yielding polycarboxylic esters or compounds used in particular in moulding, rolling and textile coating operations. These polycarbonates can also react with isocyanates, yielding polyurethanes used in the creation of flexible or rigid polyurethane foams.

Other prior art documents [Polymer letters, vol. 14, p. 169-165 (1971) or Makromol. Chem. 191, 465-472 (1990)] mention other conditions by which ethylene (and propylene, in the second document) polycarbonate is obtained, which:
  in the first document, consist of the catalytic polymerisation of the heterocyclic ethylene carbonate in the presence of a suitable catalyst, such as Ti (Obu)$_4$
  in the second document, consist of copolymerising methyloxirane with $CO_2$.

However, these documents propose means that involve more laboratory work than work intended for industrial development.

Finally, the prior art (U.S. Pat. No. 5,721,305) discloses that it is possible to produce glycerol polymers from glycerol, or from a compound such as 2,2 dimethyl-1,3-dioxolane-4-methanol, glycidol or glycerol carbonate, the polymerisation being performed in the presence of a hydrotalcite-type anionic clay. In the specific case of the use of glycerol carbonate as the starting material, it is desirable for the glycerol carbonate to be prepared by a reaction with glycerol and diethyl carbonate. The results of the analysis of the mixture resulting from the polymerisation (example 5) show that linear or cyclic oligomers of glycerol and glycerol monocarbonate dimers, or trimers or tetramers are obtained, whereas it might have been expected to obtain glycerol polycarbonates in the form of dimers, trimers or tetramers, which is not the case.

It therefore appears from this last document that glycerol carbonate cannot be used as a reaction material in a polymerisation method in order to obtain a glycerol polycarbonate in the form of oligomers, for example.

Thus, the methods proposed in the prior art describe means implemented for producing glycerol carbonate, but do not provide means to be implemented in order to obtain glycerol polycarbonates.

SUMMARY OF THE INVENTION

Therefore, the invention proposes:
creating a method for catalytic production of glycerol polycarbonate, by catalytic polymerisation,
forming an organic composition, including at least glycerol polycarbonates in a mixture with other useful compounds,
extracting the glycerol polycarbonates and optionally other useful compounds from this organic composition,
showing their primary applications.

DETAILED DESCRIPTION OF A PREFERRED EMBODIMENT

The invention relates first to an organic composition having characteristics of high thermal stability, fire resistance, tribological multifunctionality, biodegradability, non-toxicity to humans, animals and the environment, resistance to oxidation and hydrolysis, high wettability, excellent rheological properties and electrical conductivity, which is characterised in that it includes at least:

a) glycerol polycarbonates represented by the general formula:

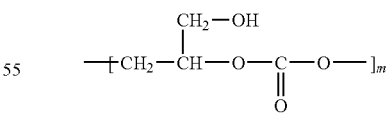

in which "m" is equal to at least 2, and has a value between 2 and 100.

b) glycerols satisfying the general formulas:

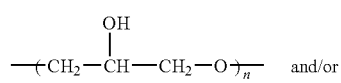   and/or

-continued

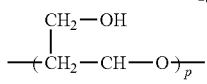

in which "n" and "p" are each equal to at least 2, each having a value between 2 and 150.

c) [(α-hydroxymethyl)oxyethylene (α-hydroxymethyl)ethylene carbonate)] copolymers represented by the general formula:

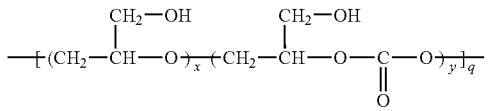

in which "x" is equal to at least 2 and has a value between 2 and 100, "y" is equal to at least 2 and has a value between 2 and 100 and "q" is equal to at least 2 and has a value between 2 and 100.

d) optionally, [(α-alkyl)oxyethylene/(α-alkyl)ethylene carbonate] copolymers represented by the general formula:

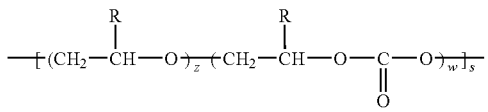

in which "z" is equal to at least 2 and has a value between 2 and 100. "w" is equal to at least 2 and has a value between 2 and 100 and "s" is equal to at least 2 and has a value between 2 and 100, while R is H or a $C_1$ to $C_4$ hydrocarbon chain.

e) optionally, [(α-alkyl)oxyethylene/(α-hydroxyalkyl) oxyethylene] copolymers represented by the general formula:

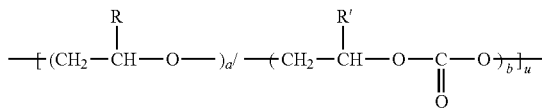

in which "a" is equal to at least 2 and has a value between 2 and 100, "b" is equal to at least 2 and has a value between 2 and 100 and "u" is equal to at least 2 and has a value between 2 and 100, while R is H or a chain at $C_1$ to $C_4$ hydrocarbon chain and R' is a $C_1$ to $C_4$ hydroxylated hydrocarbon chain.

The invention then relates to homopolymer glycerol polycarbonates, in general, as new products, with the general formula:

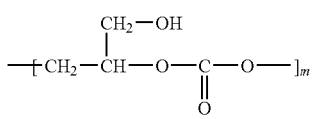

in which "m" is equal to at least 2, has a value between 2 and 100, and also concerns, in particular, glycerol polycarbonates extracted from the organic composition, by known suitable extraction means.

The invention also relates to each of the copolymers in general, as new products, and each of these copolymers, in particular, which can be extracted from the organic composition by known suitable extraction means, each of these copolymers having its own formula of:

[(α-hydroxymethyl)oxyethylene/(α-hydroxymethyl)ethylene carbonate] copolymers represented by the general formula:

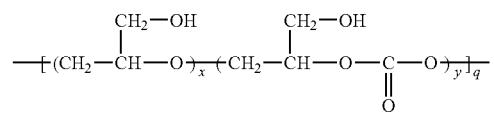

in which "x" is equal to at least 2 and has a value between 2 and 100, "y" is equal to at least 2 and has a value between 2 and 100 and "q" is equal to at least 2 and has a value between 2 and 100.

[α-alkyl)oxyethylene/(α-alkyl)ethylene carbonate] copolymers represented by the general formula:

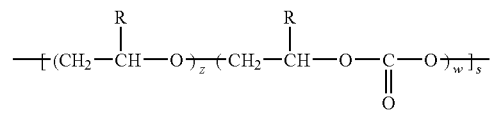

in which "z" is equal to at least 2 and has a value between 2 and 100, "w" is equal to at least 2 and has a value between 2 and 100 and "s" is equal to at least 2 and has a value between 2 and 100, while R is H or a $C_1$ to $C_4$ hydrocarbon chain.

[(α-alkyl)oxyethylene/(α-hydroxyalkyl)oxyethylene] copolymers represented by the general formula:

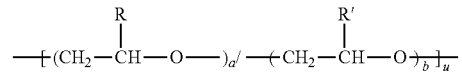

in which "a" is equal to at least 2 and has a value between 2 and 100, "b" is equal to at least 2 and has a value between 2 and 100 and "u" is equal to at least 2 and has a value between 2 and 100, while R is H or a $C_1$ to $C_4$ hydrocarbon chain and R' is a $C_1$ to $C_4$ hydroxylated hydrocarbon chain.

Finally, the invention relates to a method for catalytic production of the organic composition, including at least glycerol polycarbonates, in a mixture with other useful compounds, in particular polyglycerols, [α-hydroxymethyl)oxyethylene/(α-hydroxymethyl)ethylene carbonate] copolymers; optionally [(α-alkyl)oxyethylene/(α-alkyl)ethylene carbonate] copolymers, optionally [(α-alkyl)oxyethylene/(α-hydroxyalkyl)oxyethylene] copolymers, glycerol carbonate and/or other organic carbonates, glycerol and/or other co-produced and/or residual compounds, by catalytic polymerisation in a heterogeneous reaction medium comprising an organic liquid phase made up of at least one compound providing hydroxyl functions and at least one compound providing carbonate functions, a solid phase that may be solubilised, formed by a catalyst containing active sites in the Lewis and/or Bronsted sense and an ambient gaseous phase, with the reaction medium being heated, which is characterised in that the catalytic polymerisation is conducted:

in a first step, by bringing the heterogeneous reaction medium to a temperature no higher than 160° C., subjecting the reaction medium and the ambient gaseous phase to a pressure equal to at least $10^5$ Pa, while controlling the flow of gaseous or liquid reaction co-products, throughout said step, in a second step, when the emission of $CO_2$ begins, by bringing the heterogeneous reaction medium to a temperature equal to at least the final temperature of the first step, subjecting the gaseous phase containing the $CO_2$ generated in situ to a pressure equal to at least $2.5 \times 10^3$ Pa and while controlling the nascent gaseous emission.

The organic composition according to the invention is composed essentially of glycerol polycarbonate, in a mixture with polyglycerols, [(α-hydroxymethyl)oxyethylene/(α-hydroxymethyl)ethylene carbonate] copolymers and optionally [(α-alkyl)oxyethylene/(α-alkyl)ethylene carbonate] copolymers, in which the alkyl radical is H or a $C_1$ to $C_4$ hydrocarbon chain optionally of [(α-alkyl)oxyethylene/(α-hydroxyalkyl)oxyethylene] copolymers and/or others.

However, the composition can also contain glycerol carbonate and/or other organic carbonates and glycerol when said glycerol provides hydroxyl functions, in particular when the initial amount of the compound providing hydroxyl functions in the reaction medium is imbalanced with respect to the initial amount of the compound providing carbonate functions.

More specifically, the composition according to the invention is characterised in that it contains:
  5% by weight to 85% by weight glycerol polycarbonate
  15% by weight to 50% by weight polyglycerol
  0.1% to 50% by weight poly[(α-hydroxymethyl) oxyethylene/(α-hydroxymethyl ethylene carbonate)]
  0% to 50% by weight [(α-alkyl)oxyethylene/(α-alkyl)ethylene carbonate] copolymers
  0% to 50% by weight [(α-alkyl)oxyethylene/α-hydroxyalkyl)oxyethylene] copolymers,
and can also contain:
  0.1% by weight to 60% by weight glycerol carbonate and/or other organic carbonates,
  5% by weight to 50% by weight glycerol
  1% by weight to 5% by weight of a mixture of organic carbonates other than glycerol carbonate and co-produced reaction alcohols.

The organic composition according to the invention is also characterised by the fact that the ratio of glycerol polycarbonate to polyglycerol is between 0.25 and 6.

Although the composition according to the invention can already be characterised by the detection of the various components forming it, it is also possible to characterise it by other characteristics resulting from analyses performed in the same liquid polymers.

Thus:
The gel permeation chromatography (GPC) of the composition according to the invention shows an increase in the average molecular mass with respect to an equivalent control composition made up of glycerol carbonate, showing that said composition indeed contains glycerol carbonate polymers.

The "High-Pressure Liquid Chromatography" (HPLC) method, which consists of injecting the composition according to the invention into a liquid fluid, called the "mobile phase" (diluted sulphuric acid solution) and of passing it through a chromatographic column filled with granules constituting a "stationary phase". This stationary phase enables the constituents present in the composition according to the invention to be separated according to their polarity and according to their steric properties (i.e. their degree of polymerisation). The constituents of the composition according to the invention are unequally retained in the column and are eluted one after another in said column. The constituents eluted separately are detected by refractometry, causing a peak to be recorded for each constituent, allowing for a qualitative and quantitative analysis of the composition according to the invention (FIG. 1 and FIG. 2).

"Mass spectrometry fast atom bombardment" (MS-FAB), which consists of subjecting a sample to be analysed, solution-treated in a viscous organic solvent (glycerol, thioglycerol), to a fast atom bombardment (xenon, argon) in a mass spectrometer, said atoms being capable of having an energy on the order of 8 KeV, said bombardment causing the formation of ions. The ions formed are accelerated by a potential difference, then analysed after having been deflected as a function of the mass/load ratio (m/z) and characterised. More directly, mass spectrometry FAB makes it possible to characterise the different polymers subjected to the analysis: the average molecular weight of each polymer of the organic composition according to the invention determined by the SM-FAB method appears to be between 100 and 10,000 (FIG. 3).

The infrared spectrum of the composition according to the invention shows the appearance of a band at the frequency 1735 $cm^{-1}$ typical of the linear carbonate function, and the reduction in intensity of the frequency band 1403 $cm^{-1}$, typical of the presence of the —$CH_2$—OH function with respect to an equivalent control composition formed by cyclic glycerol carbonate. The appearance of a high-intensity frequency band at 1100 $cm^{-1}$ shows the presence of —C—O—C— "ether" bonds characteristic of polyethers. The appearance of the frequency band 1735 $cm^{-1}$ specific to the linear carbonate shows the presence of linear glycerol carbonate, and the reduction in the intensity of the frequency band 1403 $cm^{-1}$ shows the increase in the chain length at the level of the lateral hydroxymethyl grouping (FIG. 4).

The hydroxyl level measured in the composition according to the invention is between 200 and 1200 milligrams of KOH per gram of sample and preferably between 650 and 1000 (Standard NFT 60/213).

The viscosity of the composition according to the invention can be between 50 and 50,000 centistokes at 40° C. (cSt), while the viscosity of an equivalent control composition made up of glycerol carbonate is around 25 cSt at 40° C. (according to standard ASTM no. D445).

The composition according to the invention can be used as is for numerous applications, or it can be subjected to a selective extraction of at least one of its constituents.

Insofar as the composition according to the invention is implemented as is, it may have to be subjected to a separation of the two phases, one liquid and the other solid, with the solid phase being constituted by the catalyst used in the polymerisation reaction between the components forming the initial reaction medium.

Such a separation can be performed by known means, for example, filtration, centrifugation, decantation or other separation methods.

After this separation, the organic composition can be implemented in numerous applications for which it is suited owing to its intrinsic qualities.

Among the most important intrinsic qualities, we can cite the multifunctionality of the composition, its non-toxicity to humans, animals and the environment, its biodegradability, its tribological qualities, its thermal stability, and its resistance to oxidation and hydrolysis, its high wettability, its rheological and electrical properties, its hydrophilic qualities, which make it water-soluble, and so on.

Therefore, there are a variety of possible applications in which the composition according to the invention can be used.

Among the possible applications, we can cite, by way of illustration, those relating to technical fields such as:
hydraulic fluids,
lubrication,
wood treatment and decoration,
fireproofing,
biodegradability,
detergency,
oil exploration and production,
water treatment,
cosmetics,
pharmacy,
food,
chemical intermediates and in particular the intermediates of polymer chemistry,
and numerous other fields.

If it is preferable not to implement the composition according to the invention in as is form, because it appears to be necessary to use one of the compounds formed, a selective extraction of the desired component is performed by a separation method known from the prior art.

It is possible to indicate some known separation methods, such as:
preparatory separation by gel permeation chromatography (GPC, which consists of separating the polymers by the size effect of solution-treated macromolecules in a suitable solvent. For all of the polymers and copolymers to be extracted from the composition, namely the glycerol polycarbonates, the polyglycerols and the copolymers mentioned above, with different molecular weight and different solubilities, such a separation method is successfully applied to the extraction of each polymer and copolymer present in the composition.

liquid/liquid extraction, which consists of mixing the organic composition containing the polymers and copolymers to be extracted with liquids that are non-miscible with regard to said composition, then conducting a gradual enrichment of each extraction liquid with polymers and copolymers to be extracted, and analysing the polymers and copolymers present in each extraction liquid that are non-miscible with the composition. By this liquid/liquid extraction method, it is possible to extract, by gradual enrichment, the different polymers, copolymers and other useful compounds of the composition according to the invention. This separation by liquid/liquid mixture is preferably done by means of solvents such as, for example, acetone, acetonitrile, tetrahydrofuran and ethylic ether.

conventional distillation or molecular distillation or "short-path" distillation, which consists of separating the constituents present in the composition according to the invention, by their specific boiling points. Molecular distillation differs from conventional distillation in that the distance between the heating component, which brings each constituent to a boil, and the cooling component, which condenses and collects each constituent, is equal to the mean free path of each constituent in the gaseous state. As the composition according to the invention is made up of glycerol polycarbonates, polyglycerols and [(α-hydroxymethyl)oxyethylene/(α-hydroxymethyl)ethylene carbonate] copolymers; optionally [(α-alkyl)oxyethylene/(α-alkyl)ethylene carbonate] copolymers, optionally [(α-alkyl)oxyethylene/(α-hydroxyalkyl)oxyethylene] copolymers, and can also contain glycerol carbonate, other organic carbonates other such as ethylene carbonate, propylene carbonate, glycerol and other alcohols with different boiling points, this separation method is particularly suitable for allowing the separation of each constituent.

the SMB method known as the "Simulated Moving Bead" method, which consists of a continuous separation by resin chromatography of a solution mixture in an eluent by simulating a movement of the resin against the flow of the eluent. According to this method, a plurality of columns containing an ion exchanging resin suitable for the compounds to be separated are series mounted and supplied continuously by the composition according to the invention by the head column, with the last columns being equipped with elution outlets allowing for the selective extraction of each compound of the organic composition supplied. This organic supply composition, which is an intimate mixture of different compounds is subjected to selective separation by the fact that each compound is retained differently by the resin, according to its own affinity coefficient. Thus, each compound selectively retained by the resin is selectively separated from the other compounds by a suitable eluent and selectively extracted from the organic composition according to the invention.

Therefore, by one of these known methods, the polymers and copolymers present in the organic composition according to the invention can be isolated, then extracted:
glycerol polycarbonates
polyglycerols
copolymers [(α-hydroxymethyl)oxyethylene/(α-hydroxymethyl)ethylene carbonate] copolymers and [(α-alkyl)oxyethylene/(α-alkyl)ethylene carbonate] copolymers and [(α-alkyl)oxyethylene/(α-hydroxyalkyl) oxyethylene] copolymers.

Most of the polymers and copolymers resulting from the composition according to the invention have linear structures. Nevertheless, it is possible for said composition to contain branched polymers and copolymers, and even cyclic ones in the presence of oligomers, or with cyclic terminations of the polymer chains.

The invention also relates to a method for catalytic production of the organic composition, including at least glycerol polycarbonates, in a mixture with other useful compounds, in particular polyglycerols, [(α-hydroxymethyl)oxyethylene/(α-hydroxymethyl ethylene carbonate)] copolymers, optionally [(α-alkyl)oxyethylene/(α-alkyl)ethylene carbonate] copolymers, glycerol carbonate and/or other organic carbonates, glycerol and/or other co-produced compounds, and glycerols and/or other alcohols.

The method for producing the organic composition according to the invention, by catalytic polymerisation, in a heterogeneous reaction medium comprising an organic liquid phase formed by at least one compound providing hydroxyl functions and at least one compound providing carbonate functions reacting with one another, a solid phase capable of being solubilised, formed by a catalyst containing active sites in the Lewis and/or Bronsted sense and an ambient gaseous phase, with the reaction medium being heated, is characterised in that the catalytic polymerisation reaction is conducted according to two related steps:
the first step consists of a catalytic reaction, with the heterogeneous reaction medium being brought to a temperature no higher than 160° C., subjecting the reaction medium and the ambient gaseous phase to a pressure equal to at least $10^5$ Pa, while controlling the gaseous emission or drawing off the liquid reaction co-products throughout said step, the second step, when the emission of $CO_2$ begins, consists of a catalytic reaction conducted at a temperature equal to at least the final temperature of the first step, subjecting the gaseous phase containing the $CO_2$ generated in situ to a pressure equal to at least $2.5 \times 10^3$ Pa while controlling the $CO_2$ gaseous emission generated in situ during said step.

According to the method of the invention, the amounts of compounds providing hydroxyl functions and compounds providing carbonate functions introduced into the reaction medium are on the order of 0.65 to 2.00 moles and preferably 0.80 and 1.20 moles of compounds providing carbonate functions for a mole of compounds providing hydroxyl functions, with the excess of hydroxyl function providers facilitating the priming and execution of the desired polymerisation reaction.

The compounds providing hydroxyl functions involved in the method of the invention are chosen from the group constituted by glycerol, glycidol, glycol ethylene, the propane diols, 2,2 dimethyl 1,3 dioxolane 4 methanol, taken alone or in a mixture.

The compounds providing carbonate functions involved in the method of the invention are chosen from the group constituted by urea, alkylene carbonates and in particular ethylene carbonate, propylene carbonate, butylene carbonate, dialkyl carbonates, and in particular diethyl carbonate and dimethyl carbonate.

The catalytic polymerisation reaction according to the invention can be initiated by an initial carbonation reaction, which can occur in the first step of the method by direct carbonation or transcarbonation.

If the catalytic polymerisation reaction according to the invention is initiated by direct carbonation, the compound providing hydroxyl functions is preferably glycerol, and the compound providing carbonate functions is preferably urea.

In such a direct carbonation, there is an ammonia emission, which is controlled throughout the first step of the method.

If the catalytic polymerisation reaction according to the invention is initiated by transcarbonation, the compound providing hydroxyl functions is chosen from the group consisting of glycerol, glycidol, glycol ethylene, the propane diols, 2,2 dimethyl 1,3 dioxolane 4 methanol, taken alone or in a mixture.

the compound providing carbonate functions is chosen from the group constituted by the cyclic alkylene carbonates, including, in particular, ethylene carbonates, propylene carbonate, butylene carbonate and/or the dialkyl carbonates, in particular diethyl carbonate and dimethyl carbonate.

During such a transcarbonation, a co-product of the initial transcarbonation appears in the liquid reaction phase, which is an alcohol or a mixture of alcohols, which are optionally to be removed as they are produced.

The catalyst involved in the catalytic polymerisation reaction between the compound providing carbonate functions and the glycerol can be chosen from the metal salts, including sulphates, metal nitrates, and more specifically, the metal sulphates such as: zinc sulphate, manganese sulphate, magnesium sulphate, nickel sulphate, iron sulphate, cobalt sulphate and sodium sulphate. These solid sulphates have numerous strong Lewis acid sites, which are responsible for the catalytic activity. This type of catalyst has a propensity to dissolve in the reaction medium at least during the first step of the method according to the invention and to precipitate, at the end of this first step, in a crystalline form, marking a very strong change in its initial structure, since the specific surface, after this precipitation, can increase on the order of 300 times with respect to the specific surface of the catalyst before dissolution.

The catalyst can also be chosen from the simple metal oxides, in particular, in the group constituted by zinc oxide, magnesium oxide, tin oxide, nickel oxide, iron oxide, cobalt oxide, manganese oxide or among the double metal oxides, in particular, in the group constituted by the tin and sodium oxide, the zinc and sodium oxide and the magnesium and sodium oxide.

The catalyst can also be chosen from the clays of the family of attapulgites or zeolites having the general formula:

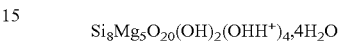

$$Si_8Mg_5O_{20}(OH)_2(OHH^+)_4, 4H_2O$$

in which the magnesium can be entirely or partially replaced by aluminium. These clays are metal oxide complexes and are therefore metal bases.

The catalyst can also be chosen from the group constituted by ion exchanging resins such as cationic resins to which metals bind, in particular zinc ($Zn^{2+}$), magnesium ($Mg^{2+}$), tin ($Sn^{2+}$) or the hydroxylated or bicarbonated anionic macroporous resins, for example, "Amberlyst A26" (R), which is in a hydroxylated form $OH^-$ and which is functionalised in the form $HCO_3^-$ and implemented in a bicarbonated form (EP 0739888).

The catalyst can also be chosen from the organometallic compounds, preferably among the organomagnesium, organozinc and organostanic compounds.

The catalyst can also be chosen from the group constituted by chemical compounds, soluble in the reaction medium, such as sodium hydroxide, potassium hydroxide, supported amines, metal alcoholates, and in particular sodium methylate or ethylate.

The catalyst according to the invention is added to the reaction medium in an amount of 0.01% by weight to 5% by weight with respect to the compound providing hydroxyl functions added to the reaction medium.

The pressure applied to the reaction medium and controlled during the first step is no greater than $10^5$ Pa, but it can preferably be lower than this maximum value in order to move the reaction equilibrium between the compound providing carbonate functions and the compound providing hydroxyl functions in the direction of eliminating the gaseous phase that may form in situ. The pressure applied to the reaction medium during the first step is preferably between $2.10^2$ and $5.10^4$ Pa.

The temperature to which the reaction medium is brought during the second step is equal to at least the final temperature of the first step and preferably chosen in the range of 180° C. to 220° C.

As regards the pressure applied to the reaction medium during the second step, it is preferably between $2.5 \times 10^3$ and $2.5 \times 10^6$ Pa so as to move the polymerisation reaction equilibrium in the direction of the formation of glycerol polycarbonate by controlling and limiting the in situ formation of the $CO_2$ gaseous phase by decomposition.

If the compound generating hydroxyl functions is glycerol and the compound generating carbonate functions is urea, the highly-reactive gaseous effluents, which are the nascent ammonia and the nascent carbon anhydride released, can be used for the purpose of creating urea, starting materials used in the reaction medium according to the known methods.

The organic composition and the polymers or copolymers resulting from this composition can be applied in numerous major fields.

The fields are, in particular, for the most significant, and by way of illustration, those of motor vehicle and industrial lubricants, more specifically those intended for metal working or machining, hydraulic fluids and more specifically fire-resistant ones, mould-release agents, wood treatment products, additives for drilling mud, detergency, wetting additives and thickeners, pharmacy, cosmetics, food, and chemical synthesis intermediates or the like.

These numerous and major application result from the numerous specific characteristics developed by this organic composition and/or one of the polymers or copolymers resulting from this composition, such as tribologic multifunctionality, non-toxicity to humans, animals and the environment, biodegradability, thermal stability, resistance to oxidation and hydrolysis, high wettability, rheological properties, electrical properties, and their hydrophilic and water-soluble characteristics.

The examples below show the subject matter of the invention, to provide a better understanding of it without limiting its scope.

EXAMPLES

Production of an Organic Composition According to the Invention Containing Glycerol Polycarbonate, Polyglycerol, Glycerol Carbonate and Glycerol A reaction medium M containing a compound providing hydroxyl functions and a compound providing carbonate functions was prepared in order to produce the organic composition according to the invention, containing at least in part glycerol polycarbonates.

Examples 1 to 7

FIGS. 1 to 5

Example 1 is a control example to which examples 2 to 6, which show the subject matter of the invention, are compared.

Examples 2 to 6 show the catalytic polymerisation by direct carbonation according to the invention.

In the case of catalytic polymerisation being initiated by a direct carbonation reaction, 120 g of glycerol and 82 g of urea, and 2.6 g of catalyst (mono-hydrated zinc sulphate) are introduced into a closed reactor, creating the reaction medium M.

This reaction medium, placed under agitation, is heated during the first step for a time t1 at a set temperature T1, maintaining a set pressure P1 of no more than $10^5$ Pa in the reaction medium. Nascent ammonia is formed in situ and the composition of the gas flow is controlled while maintaining a pressure P1 of no more than $10^5$ Pa. When the ammonia emission fades in the gas flow controlled in situ, the second step is initiated by bringing the set temperature of the medium from T1 to T2 for a time t2, with the set pressure P2 of the reaction medium being placed and maintained at a pressure chosen from the range $2.5 \times 10^3$ Pa to $2.5 \times 10^6$ Pa. The gaseous medium generated in situ is primarily composed of nascent $CO_2$, of which the amount formed is large at the beginning of the second step. The gas flow formed has a propensity to diminish until it becomes weak and even nonexistent by the end of said second step, and the amount of $CO_2$ produced in situ has a tendency to move toward 0 without any signs.

The reaction medium is then collected and analysed.

All of the process conditions of examples 1 to 6 are presented in table 1, while the quantitative analysis of the final reaction medium constituting the composition according to the invention, and the determination of the average molar mass, the viscosity and the hydroxyl level of these same examples are presented in table 2.

The reaction medium of the first step and of the second step of each example 1 to 6 according to the invention was analysed by high-pressure liquid chromatography (HPLC). By way of illustration, the analysis of the reaction medium of the two steps of example 2 is described below:

A sample of the reaction medium of the first step of the method according to the invention was injected into a diluted sulphuric acid solution. This acid solution filled with the reaction medium passed through a chromatography column filled with granules for separating the various constituents of the reaction medium according to their polarity and their steric characteristics (molecular weight).

The constituents retained in specific areas of the column were selectively eluted and were subjected to refractometry detection causing a peak to be recorded for each constituent present. The chromatogram of this first step is provided in FIG. 1.

A sample of the reaction medium of the second step of the method according to the invention followed the same chromatography process. The constituents retained in the specific zones of the column were eluted and subjected to refractometry detection causing a peak to be recorded for each constituent present. The chromatogram of this second step is shown in FIG. 2.

The HPLC analysis method is implemented for the first time, in order to detect and quantify these new products, and therefore does not have an existing reference for comparison.

The comparison of the two HPLC chromatograms shows the appearance of the glycerol carbonate polymers and copolymers during the catalytic polymerisation according to the invention (chromatogram FIG. 2 by comparison with the chromatogram of FIG. 1).

The comparative analysis shows a significant reduction in the amount of compounds initially present in the reaction medium and the appearance of new compounds, which are in particular glycerol carbonate polymers and copolymers.

Example 7 shows the catalytic polymerisation by transcarbonation according to the invention.

In the case of catalytic polymerisation being initiated by a transcarbonation reaction, 11 g of glycerol, 24 g of ethylene carbonate and 1 g of zeolite as the reaction catalyst were introduced into the same closed reactor.

According to the first step, this reaction medium, placed under agitation, is heated during the first step for a time t1 (60 min) at a set temperature T1 (140° C.), maintaining said reaction medium at a set pressure P1 of no more than $10^5$ Pa.

According to the second step, when the emission of $CO_2$ begins, the reaction medium is placed under a set pressure P2 of $3 \times 10^3$ Pa, and its temperature is brought to the set temperature T2 (180° C.) for a time t2 of 180 minutes.

The various compounds present in the reaction medium collected are determined by analysis using the HPLC method. This analysis shows a decrease in the amount of compounds initially present in the reaction medium and the appearance of new compounds.

The formation of these compounds is confirmed by the nascent $CO_2$ emission measured by a barium hydroxide solution.

The average molecular masses of the compounds are determined by gel permeation chromatography (GPC), which method shows an increase in the average molecular mass of the reaction medium, proving that the reaction is indeed a polymerisation reaction, measured by bubbling in a saturated barium hydroxide solution.

The viscosities expressed in centistokes (cSt) are measured using a Canon-Fenske viscometer, at 40° C. (standard NFT 60-100, NFT 60-136 and ASTM D 445-96).

The hydroxyl level is determined according to standard NFT 60-213 and expresses the —OH bonds available.

All of the process conditions in example 7 are presented in table 1, while the quantitative analysis of the final reaction medium constituting the composition according to the invention, and the determination of the average molar mass, the viscosity and the hydroxyl level of the same examples are presented in table 2.

TABLE 1

Process conditions of the method

|  | Example 1 Control | Example 2 | Example 3 | Example 4 | Example 5 | Example 6 | Example 7 |
|---|---|---|---|---|---|---|---|
| Compound providing: hydroxyl functions catalysing carbonate functions 1st step | 120 g of glycerol 82 g of urea 2.6 g of $ZnSO_4, H_2O$ | 120 g of glycerol 82 g of urea 2.6 g of $ZnSO_4, H_2O$ | 120 g of glycerol 82 g of urea 2.6 g of $ZnSO_4, H_2O$ | 120 g of glycerol 82 g of urea 2.6 g of $ZnSO_4, H_2O$ | 120 g of glycerol 82 g of urea 2.6 g of $Na_2SO_4$ | 120 g of glycerol 80 g of urea 2.6 g of $MgO_4$ | 11 g of glycerol 24 g of ethylene carbonate 1 g of zeolite |
| temperature T1 | 145° C. | 140° C. | 140° C. | 140° C. | 140° C. | 150° C. | 140° C. |
| time t1 | 360 min | 360 min | 360 min | 360 min | 480 min | 480 min | 60 min |
| pressure P1 | $4.10^3$ Pa | $4.10^3$ Pa | $4.10^3$ Pa | $4.10^3$ Pa | $6.10^3$ Pa | $6.10^3$ Pa | $10^5$ Pa |
| 2nd step |  |  |  |  |  |  |  |
| temperature T2 | 160° C. | 180° C. | 200° C. | 220° C. | 180° C. | 180° C. | 180° C. |
| time t2 | 150 min (at 160° C.) | 150 min (at 180° C.) | 150 min (at 200° C.) | 150 min (at 220° C.) | 150 min (at 180° C.) | 150 min (at 180° C.) | 180 min (at 180° C.) |
| pressure P2 | $10^5$ Pa | $10^5$ Pa | $10^5$ Pa | $10^5$ Pa | $10^5$ Pa | $10^5$ Pa | $3.10^5$ Pa |

TABLE 2

(FIGS. 1 to 5)

|  | Example 1 Control | Example 2 | Example 3 | Example 4 | Example 5 | Example 6 | Example 7 |
|---|---|---|---|---|---|---|---|
| Analysis of medium: GPC(1) Final reaction: GP(2) Composition Copo (c)(3) Copo (d)(4) Copo (e)(5) | 2% 2% demonstrated but not quantified | 18% 21% demonstrated but not quantified | 18% 60% demonstrated but not quantified | 8% 75% demonstrated but not quantified | 23% 27% demonstrated but not quantified | 14% 26% demonstrated but not quantified | 8% 6% demonstrated and quantified: 70% |
| Cumulative % by weight of homopolymers and copolymers of final reaction medium | 6% | 44% | 80% | 83% | 54% | 44% | 84% |
| Co-products and reaction residues | 94% | 56% | 20% | 17% | 46% | 56% | 16% |
| Average molar mass of final reaction medium in g/mol | 230 | 300 | 490 | 570 | 330 | 340 |  |
| Viscosity cSt Centistoke at 40° C. | 80 | 200 | 5000 | 15000 | 5600 | Undetermined | 270 |

TABLE 2-continued (FIGS. 1 to 5)

|  | Example 1 Control | Example 2 | Example 3 | Example 4 | Example 5 | Example 6 | Example 7 |
|---|---|---|---|---|---|---|---|
| Milligrams of KOH per gram of sample | 72 | 252 | 290 | 306 | 342 | 342 | 342 |

(1) Glycerol polycarbonate
(2) polyglycerol
(3) copo (3), (4) and (5) demonstrated but not quantified
(6) co-products and reaction residues: glycerol carbonate, glycols, etc.), ethylene carbonate, glycerol.

Examples 8 to 11

Liquid/Liquid Extraction of Glycerol Polycarbonate, Polyglycerol, Glycerol Carbonate and Glycerol Using Four Solvents To do this, we used 18 g of the organic composition of example 5, which were placed in a separatory funnel, in the presence of the solvents mentioned below.
Example 8: acetone
Example 9: acetonitrile
Example 10: ethylic ether
Example 11: tetrahydrofuran
The results of the extraction using these four solvents are presented in table 3.

Example 12

This Example Relates to the Determination of Molar Masses by a Mass Spectrometry Method (MS-Fab According to FIG. 3)

The organic composition of example 5 was subjected to mass spectrometry, which made it possible to characterise the structures of the glycerol polycarbonates in the form of oligomers, polyglycerol, also in oligomer form and the [(α-hydroxymethyl)oxyethylene/(α-hydroxymethyl ethylene carbonate)] copolymer.

The positive SM-FAB spectra profiles (thioglycerol matrix) characterised by peaks of ions MH$^+$ and (MH-H$_2$O)$^+$ after protomisation, were obtained.

TABLE 3

Liquid/liquid extraction

| Example | 8 Acetone | | 9 Acetonitrile | | 10 Ethylic ether | | 11 Tetrahydrofuran | |
|---|---|---|---|---|---|---|---|---|
|  | Enriched | Depleted | Enriched | Depleted | Enriched | Depleted | Enriched | Depleted |
| GC (1) | 29 | 39 | 25 | 40 | 9 | 81 | 28 | 38 | 25 |
| GPC (2) | 18 | 21 | 17 | 22 | 12 | 1 | 17 | 20 | 18 |
| G (3) | 16 | 15 | 16 | 14 | 22 | 13 | 16 | 15 | 15 |
| GP (4) | 34 | 25 | 37 | 23 | 47 | 6 | 35 | 28 | 37 |

(1) glycerol carbonate
(2) glycerol polycarbonate
(3) glycerol
(4) polyglycerol

An enrichment in the glycerol polycarbonate and the glycerol carbonate solvent phase (aside from example 10) may be observed, while a depletion of this same phase of the glycerol and polyglycerol occurs.

The reverse phenomenon occurs in the non-solvent phase.

By the successive extractions, it is possible to enrich one of the solvents with at least one of the compounds and in particular glycerol polycarbonate for examples 8, 9 and 11.

In the case of example 10, a tendency toward the enrichment of small molecules, i.e. monomers such as glycerol carbonate and glycerol, may be observed, in addition to a depletion of the large molecules such as glycerol polycarbonate and polyglycerol. The ethyl ether then makes it possible to isolate, in at least one second passage, the glycerol polycarbonate from the polyglycerol.

Finally, it may also be observed that the enrichment occurs by affinity between molecules of the same family, such as polycarbonates and glycerol carbonate, with respect to polyglycerol and glycerol.

a) Glycerol Polycarbonate:

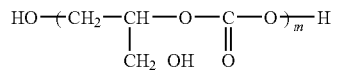

| | Polymerisation index m | | | | | | |
|---|---|---|---|---|---|---|---|
| | 1 | 2 | 3 | 4 | 5 | 6 | 7 |
| MH$^+$ peaks | 137 | 255 | 373 | 491 | 609 | 727 | 845 | b) Polyglycerol:

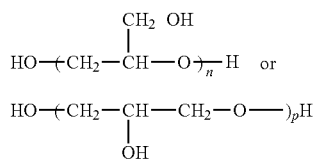

| | Polymerisation index n or p | | | | | | | |
|---|---|---|---|---|---|---|---|---|
| | 1 | 2 | 3 | 4 | 5 | 6 | 7 | 8 |
| MH⁺ peaks | 93 | 167 | 241 | 315 | 389 | 463 | 537 | 611 | c) Copolymer: [(α-hydroxymethyl)oxyethylene/(α-hydroxymethyl)ethylene carbonate]

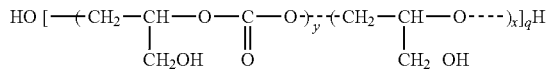

| | Polymerisation index n or p | | | | | | | |
|---|---|---|---|---|---|---|---|---|
| | 1 | 2 | 3 | 4 | 5 | 6 | 7 | 8 |
| MH⁺ peaks | 211 | 285 | 359 | 433 | 507 | 581 | 655 | 729 |
| (MH—H₂O)⁺ | 193 | 267 | 341 | 415 | 489 | 563 | 729 | 711 |

Thus, the recording of the mass spectrum (FIG. 1) shows the presence in the composition according to the invention of the glycerol polycarbonates, polyglycerol and [(α-hydroxymethyl)oxyethylene/(α-hydroxymethyl)ethylene carbonate] copolymers.

Example 13

Selective Separation of Glycerol Polycarbonate from a Composition According to the Invention by the Molecular Distillation Separation Method or "Short-Path" Distillation The molecular or "short-path" distillation was performed using a pilot device KDT6 of UIC-GMBH.

The organic composition according to the invention, according to example 5, is composed essentially of glycerol polycarbonate, in a mixture with polyglycerols, [(α-hydroxymethyl)oxyethylene/(α-hydroxymethyl ethylene carbonate)] copolymers, [(α-alkyl)oxyethylene/(α-alkyl)ethylene carbonate] copolymers in which the alkyl radical is H or a $C_1$ to $C_4$ hydrocarbon chain, [(α-alkyl)oxyethylene/(α-hydroxyalkyl)oxyethylene] copolymers and co-products and reaction residues, which are glycerol carbonate, ethylene carbonate, glycols and the like.

This organic composition was first subjected to a scalping operation to eliminate the first distillates at a temperature of no more than 165° C.

The organic composition according to the invention, after scalping, has a weight of 3880 g.

This composition was first subjected to distillation at 165° C. under reduced pressure, which yielded 590 g of distillate and 3290 g of residue. This residue (3290 g) was subjected to distillation at 185° C. under the same reduced pressure, which yielded 67.8 g of distillate.

Thus, cumulatively, from the temperature of 165° C., distillation levels were reached, at which the distillates and the residues were collected. The viscosities of these distillates and residues were measured, and it appears that the higher the distillation temperature is, the more the separated fractions have a higher viscosity (i.e. higher molecular weights).

The results of the distillation by successive levels are presented in table 4. This table includes the viscosities in centistock (cSt).

TABLE 4

| Temperature ° C. | Pressure mb | Distillate (g) | Viscosity (cSt) at 40° C. | Residue (g) | Viscosity (cSt) at 40° C.* | Flow rate (g/h) |
|---|---|---|---|---|---|---|
| Reference | Before distillation | | 7500 | | 110 | |
| 165 | 2.10-2 | 590 | 260 | 3290 | 142 | Around 1000 |
| 185 | 2.10 = 1 | 67.8 | 903 | Collect | | |
| 205 | 2.10-2 | 84.6 | 1300 | Collect | | |
| 220 | 2.10-2 | 81.9 | 1725 | Collect | | |
| 240 | 2.10-2 | 111 | 2070 | Collect | 162 | |
| 250 | 2.10-2 | 286 | 2204 | 530 | 192 | 1200 |
| Liquid trap N₂ | After distillation | | 84** | | | |
| Summary % (last/overall) | | 35/54.4 | | 65/45.6 | | |

*measurement of the viscosity performed after 25% dilution in glycerol carbonate
**by comparison, the viscosity of the glycerol carbonate at 40° C. is 36 cSt.

From the results presented in this table, it appears that the "short-path" distillation makes it possible to:

fractionate the polymers and copolymers of the organic composition according to the invention shown by thickening capacities in the distillates and residues (the change in viscosities in correlation with the molecular weights);

separate between 35 and around 55% by weight of the different distillates and residues of the organic composition according to the invention as needed and with an acceptable and at an industrially applicable rate.

Example 14

Application of the Organic Compositions According to the Invention to Lubrication: Thickening Properties The organic compositions according to the invention in examples no. 1 to 4 are entirely soluble in the glycerol carbonate (GC) and in water. They are tested in dilution in said two solvents or as is.

In the field of industrial lubricants, viscosity is a fundamental parameter and determines the thickness of the lubricating film. For the users, a viscosity range is proposed, with each viscosity corresponding to a precise application: an ISO classification based on the viscosity (ISO 3448) of the industrial lubricants exists and makes it possible to differentiate these lubricants from one another. For example, the indication "ISO 46" means that the lubricant thus identified has a kinematic viscosity of 46 cSt with a deviation of +/−10%, measured at 40° C.

All of the experimental data is presented in table 4.

TABLE 5

Organic composition according to the invention, solution-treated in glycerol carbonate and as is.

| Organic composition of example: | ISO46 (% mixture) | ISO68 (% mixture) | As is at 100° C. | As is at 40° C. |
|---|---|---|---|---|
| 2 | | | 8.07 | 94.1 |
| 3 | | 19 | | 30200 |
| 1 | 65 | | 62 | 6.1 |
| 4 | 13 | | 365 | 18200 |

Thus, to have a classification:
- of grade ISO46, it is necessary to have a mixture of 65% by weight of the organic composition according to the invention with 35% by weight of glycerol carbonate,
- of grade ISO68, it is necessary to have a mixture of 19% by weight of the organic composition according to the invention with 81% by weight of glycerol carbonate.

Finally, the composition according to the invention is subjected as is to a viscosity measurement at 100° C. and at 40° C.

TABLE 6

Organic composition according to the invention, solution-treated in water and as is.

| Organic composition of example: | ISO46 (% mixture) | ISO68 (% mixture) | As is at 100° C. | As is at 40° C. |
|---|---|---|---|---|
| 3 | 70 (42 cSt) | | | |
| 3 | | | | 30200 |
| 4 | | 70 (49 cSt) | 365 | 18200 |

These examples show that the organic compositions according to the invention (free of insoluble catalytic residues) are perfectly soluble in water, glycerol carbonate and all polar solvents, and that in these media, they are very good thickeners in spite of their relative low molecular weights.

Example 15

Anti-wear and Extreme Pressure Properties

These properties were measured by a machine called the "four ball test machine", after standards ASTM D4172 and D2783, respectively. After a test in the presence of lubricants, the sign of wear is determined for a ball (in mm) under a constant load (40 kg), rotating on 3 other balls, or the weld load of the balls (increasing load). The following examples were performed with steel balls 100C6 in comparison with commercial hydraulic fluids HFC and HFDU, market standard, and according to the CETOP R97H recommendation for hydraulic fluids that are relatively inflammable, constituting comparison references.

TABLE 7

| Organic composition of example: | Solvent | Diameter (mm) | Weld load (kg) |
|---|---|---|---|
| 2 | As is | 0.74 | 300 |
| 3 | As is | 0.40 | 300 |
| 1 | As is | 0.95 | 330 |
| 3 | Glycerol carbonate | 0.87 | 230 |
| 1 | Glycerol carbonate | 0.85 | 200 |
| 4 | Glycerol carbonate | 0.85 | 260 |
| 4 | Water | 0.56 | 200 |
| 4 | Water | 0.57 | 170 |
| HFC (ISO46) | Water | 0.65 | 100 |
| HFDU (ISO46) | Plant esters | 0.60 | 150 |

The same tests were also performed on stainless steel balls (304L).

TABLE 8

| Organic composition of example: | Solvent | Diameter (mm) | Weld load (kg) |
|---|---|---|---|
| 2 | As is | | 170 |
| 3 | Glycerol carbonate | | 150 |

The organic compositions according to the invention are, as in the previous examples, dissolved in a solvent (grade ISO46 or 68) before testing or as is.

It is noted that all of the tests conducted using organic compositions according to the invention, implemented as is, are dissolved either in glycerol carbonate or in water and yield results at least equal to those obtained by the controls, but almost always greater than those of the controls.

Example 16

Anti-friction Properties: (FIG. 6)

The anti-friction performance of the organic compositions according to the invention, determined by means of a Cameron-Plint tribometer (steel cylinder-on-flat configuration 100C6), in reciprocal movement with a frequency of 6 Hz, under pure sliding conditions with a sliding speed of 10 cm/s and a maximum Hertz load of 845 MPa. The compositions according to the invention and the control composition HFDU ISO46 were at room temperature at the start. The friction and wear coefficients of the products tested are by far superior to the control, as shown in the table below.

TABLE 9

| Organic composition of example: | Friction coefficient | Wear in micrometers |
| --- | --- | --- |
| 3 | 0.08 | Around 2 μm |
| 4 | 0.07 | Around 2 μm |
| Control HFDU ISO46 | 0.14 | 20 μm |

FIG. 6 also shows the stability of the friction coefficients under a load as a function of time, showing the durability of the performance under stress.

These properties (anti-wear, friction modifier, "extreme pressure") are particularly desirable in lubricants in general, but more specifically in lubricants for deformation (coining, extrusion, stamping, drawing, wire drawing, and so on) and machining (turning, rectification, tapping, and so on) of steels and other metal materials.

Example 17

Rheological Properties at Low Temperatures: Search for an Antifreezing Effect

The flow of industrial lubricants at low temperature, for example in the case of hydraulic fluids, is a particularly desirable property in cold regions and at start-up (of installations). This property was evaluated according to standard ASTM D97.

To do this, the organic composition of example 4 was dissolved in glycerol carbonate to obtain a viscosity grade ISO46 like the two market standard controls.

TABLE 10

| Organic composition of example 4 | | Solvent | Pour point (° C.) |
| --- | --- | --- | --- |
| | | Glycerol carbonate | −40 |
| Controls | HFDU (ISO46) | Plant esters | −24 |
| | HF (ISO46) | Mineral bases | −24 |
| | HFC (ISO46) | Water | −30 |

It is noted that the composition according to the invention has an excellent resistance to cold by comparison with the controls.

Example 18

Surfactant Properties

The surface tensions of the solutions, all of viscosity grade ISO46 (except for the glycerol carbonate and water) were measured at 25° C. by a ring tensiometer and show the surfactant properties of these mixtures, in particular in an aqueous medium and by comparison with a polyglycerol.

TABLE 11

| | Glycerol carbonate | Water | Commercial polyglycerol (Solvay) 76% by weight in water Control | Composition according to the invention of example 3 (70% by weight in water) | Composition according to the invention of example 4 (65% by weight in glycerol carbonate) | Composition according to the invention of example 7 (88.5% by weight in water) |
| --- | --- | --- | --- | --- | --- | --- |
| Density (1) | 1.386 | 1 | 1.1991 | 1.210 | 1.366 | 1.298 |
| Surface tension (2) | 53.81 | 70 | 62.39 | 33.45 | 51.72 | 48.09 |

(1) obtained at 25° C. (densimeter)
(2) obtained at 25° C.
Composition dissolved in glycerol carbonate according to standard ISO46.

Example 19

Hydrolysis and Oxidation Stability (FIG. 7)

The organic composition according to the invention of example 3 was dissolved in glycerol carbonate to obtain a viscosity grade ISO46. This diluted organic composition was subjected to air bubbling (10 litres/h heated at 95° C.) in the presence of chips of cast iron and a copper plate. The state of degradation of the composition according to the invention was followed by an increase in the viscosity over time measured in cSt.

The control fluid HFDU ISO46 based on plant esters was subjected to the same experimental behaviour conditions.

Example 20

Flame Resistance a) Jet Spray Test "Heat Release of a Stabilised flame" ("European Commission" Report, 7$^{th}$ edition of Luxembourg: Requirements and tests applicable to relatively inflammable liquids used for mechanical transmissions and regulations (hydrostatic and hydrokinetic).

The principle is as follows: in a combustion chamber in which air circulates, a jet spray composed of liquid (product to be tested) and pressurised air is subjected to a defined flame of a gas burner. The temperatures of the smoke and gases at the outlet and the air at the inlet are measured with and without the jet and a flammability index (RI) is determined, and, at the same time, the length of the flame (RL), the optical density of the smoke, and so on, are measured. According primarily to the first two parameters, a classification of the flame hazard is given in table 12. The higher the RI or the RL is, the more difficult it is to inflame the hydraulic fluid and the lower its flame length is.

TABLE 12

Flammability (main classification)

| | Class | | | | | | | |
|---|---|---|---|---|---|---|---|---|
| | A | B | C | D | E | F | G | H |
| Flammability index RI | >100 | 100-80 | 79-65 | 64-50 | 49-36 | 35-25 | 24-14 | <14 |
| Flame length RL | >100 | 100-56 | 55-51 | 50-11 | 10-7 | <7 | | |

The compositions according to the invention were produced in water and in glycerol carbonate by comparison with the samples of the standard market, all of grade ISO46, and were subjected to this test, new and after mechanical shearing in the "Bosch" test (CETOP RP112H), 250 cycles, said test making it possible to evaluate the stability of the flammability index of the products in operation in hydraulic power plants.

TABLE 13

RI of compounds with standard commercial controls

| Samples tested | Solvent | RI | RI stability in operation |
|---|---|---|---|
| HFDU (ISO46) | Plant esters | 6-14 | Stable |
| HFDU (IS46) | Plant esters + antimisting additives | 13-28 | Unstable: <14 |
| HFC (ISO46) | Water (40%) | 65-75 | Stable |
| HFDR (ISO46) | Phosphate esters | 30-35 | Stable |
| Example 4 | Glycerol carbonate | 25 | Stable |
| Example 5 | Water (30%) | 75 | Stable |

TABLE 14

RI and RL of compounds with controls

| Samples tested | Solvent | RI | RL |
|---|---|---|---|
| HFDU (ISO46) | Plant esters + phosphate esters + antimisting additives | 19 | 7 |
| Composition according to the invention of example 3 | Glycerol carbonate | 25 | 31 | b) The combustion heat (kJ/g) was also measured according to standard ASTM D240. The combustion heat characterises the calorific energy released by a burning compound. The higher this value is, the better fuel a compound is and the more the "fire" is maintained by this factor, which is the temperature.

TABLE 15

| Samples | Combustion heat (kJ/g) |
|---|---|
| Mineral oils | 44 |
| Heptane | 40.2 |

TABLE 15-continued

| Samples | Combustion heat (kJ/g) |
|---|---|
| Plant esters | 38.2 |
| Phosphate esters | 34.8 |
| Ethanol | 26.4 |
| Methanol | 19.6 |
| Composition according to the invention of example 3 in glycerol carbonate according to grade ISO46 | 14.5 |
| Composition according to the invention of example 2 in glycerol carbonate according to grade ISO46 | 14.3 |
| HFC control (40% water) ISO46 | 12.6 |

Example 21

Compatibility with Elastomer Seals

The organic composition according to the invention of example 4 was subjected to the compatibility test with seals of different types of elastomers according to standard ISO672 and appears to be "compatible" according to these standards.

TABLE 16

| Elastomer | T°C./ duration h | Volume % | Hardness DIDC | Tensile strength % | Elongation % |
|---|---|---|---|---|---|
| NBR (1) | 100° C./68 h | 3.17 | −5 | 0.22 | −1.37 |
| EPDM (2) | 100° C./68 h | 0.02 | −2 | 4.89 | 5.44 |
| FPM (3) | 100° C./68 h | 1.07 | 1 | −13.42 | 28.58 |

(1) NBR: Nitrile/butyl/rubber
(2) EPDM: Ethylene/propylene/diene
(3) FPM: Fluorinated polymer Example 22

Biodegradability

The organic composition according to the invention of example 4 was subjected to the biodegradation test according to standard OCDE 301B. Its biodegradability level was determined to be 90.8% after 28 days.

Example 23

Drilling Mud for Tunnel Borers or Petroleum Development

Drilling muds are made up of bentonite (specific clay) and various organic and inorganic additives. Among their numerous characteristics, their rheology, i.e. their flow (viscosity) property is essential in the various phases of use. To determine the capacity of the organic compositions according to the invention to be used in drilling muds, the composition according to the invention, of example 3, was implemented in a drilling mud based on bentonite at 30 g/l in water.

Other drilling mud samples were prepared as a control (30 and 60 g/l), and others received glycerol carbonate or polyglycerol. The rheology of each of these samples was evaluated by means of a rotational viscometer FANN, which gives a dynamic viscosity profile in millipascal seconds (mPa·s) as a function of the shear expressed in seconds$^{-1}$ ($S^{-1}$), said dynamic viscosity being proportional to the speed of rotation of the viscometer spindle: an extrapolation of these measurements gives a yield point measured in Pascal (Pa).

In practice, a high flow threshold accompanied by the lowest possible dynamic viscosity at $1021\ S^{-1}$, are generally desirable for obtaining a drilling mud that can be pumped easily and that creates a very thick "cake" at the forehead of the tool on the site, which allows for a perfect seal in both directions and, owing to a high ground bearing, facilitated removal of the cuttings of excavated land.

TABLE 17

| | Viscosity at $85\ S^{-1}$ | Viscosity at $170\ S^{-1}$ | Viscosity at $340\ S^{-1}$ | Viscosity at $511\ S^{-1}$ | Viscosity at $1021\ S^{-1}$ | Yield point (Pa) |
|---|---|---|---|---|---|---|
| Bentonite drilling mud at 30 g/l (1) Control 1 | 5.4 | 5.4 | 5.25 | 5.3 | 6.75 | Low, non measurable |
| (1) + 0.5% glycerol carbonate | 36.6 | 23.1 | 15.3 | 12.4 | 9.65 | 2.64 |
| (1) + 0.5% of the composition of example 4 | 109.8 | 61.8 | 35.55 | 26.1 | 16.75 | 8.98 |
| (1) + 0.5% polyglycerol | 10.2 | 8.7 | 7.35 | 6.8 | 7.55 | Low, non-measurable |
| Bentonite drilling mud at 60 g/l (1) Control 2 | 67.8 | 45.9 | 31.8 | 25.7 | 19.3 | 6.5 |

The organic composition according to the invention has qualities suitable for its use in the field of drilling muds.

The invention claimed is:

1. Organic composition having characteristics of high thermal stability, fire resistance, tribological multifunctionality, biodegradability, non-toxicity to humans, animals and the environment, resistance to oxidation and hydrolysis, high wettability, excellent rheological and electrical properties, said composition comprising a) a glycerol polycarbonate of the formula:

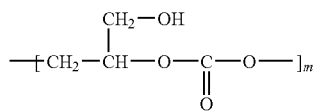

in which m is equal to at least 2, and has a value from 2 to 100;

b) a glycerol of formula:

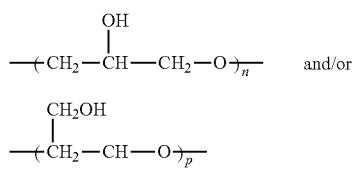 and/or in which n and p are each equal to at least 2, each having a value from 2 to 150;

c) a [α-hydroxymethyl)oxyethylene (α-hydroxymethyl) ethylene carbonate)] copolymer of the formula:

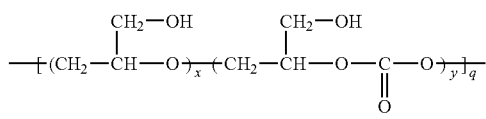

in which x is equal to at least 2 and has a value between 2 and 100, y is equal to at least 2 and has a value between 2 and 100 and q is equal to at least 2 and has a value between 2 and 100;

d) optionally, an [(α-alkyl)oxyethylene/(α-alkyl)ethylene carbonate] copolymer of the formula:

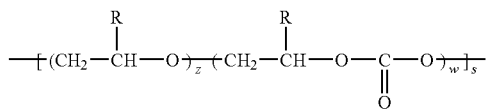

in which z is equal to at least 2 and has a value from 2 to 100, w is equal to at least 2, and has a value from 2 to 100, and s is equal to at least 2, and has a value from 2 to 100, while R is H or a $C_1$ to $C_4$ hydrocarbon chain; and e) optionally, an [(α-alkyl)oxyethylene/(α-hydroxyalkyl) oxyethylene] copolymer of the formula:

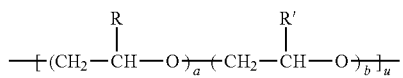

in which a is equal to at least 2 and has a value from 2 to 100, b is equal to at least 2, and has a value from 2 to 100, and u is equal to at least 2, and has a value from 2 to 100, while R is H or a chain at $C_1$ to $C_4$ hydrocarbon chain and R' is a $C_1$ to $C_4$ hydroxylated hydrocarbon chain.

2. Organic composition according to claim 1, comprising
5% by weight to 85% by weight glycerol polycarbonate
15% to 50% polyglycerol
0.1% by weight to 50% by weight poly[(α-hydroxymethyl)oxyethylene/(α-hydroxymethyl ethylene carbonate)]
0% to 50% by weight of an [(α-alkyl)oxyethylene/(α-alkyl)ethylene carbonate] copolymer in which the α-alkyl is selected from the group consisting of hydrogen, a hydrocarbon chain $C_1$ to $C_4$, and an α-hydroxyalkyl chain $C_1$ to $C_4$.

3. Organic composition according to claim 1, comprising:
0.1% by weight to 60% by weight glycerol carbonate
5% by weight to 50% by weight glycerol
1% by weight to 5% by weight of a mixture of organic carbonates other than glycerol carbonate and co-produced reaction alcohols.

4. Organic composition according to claim 1, wherein the ratio of glycerol polycarbonate to polyglycerol is from 0.25 to 6.

5. Organic composition according to claim 1, wherein the average molecular weight of each polymer present in said composition measured by mass spectrometry SM-FAB is from 100 g/mol to 10,000 g/mol.

6. Organic composition according to claim 1, wherein said composition has a measured hydroxyl level of from 200 to 1200 milligrams of KOH per gram of sample (Standard NFT 60/213).

7. Organic composition according to claim 1, having a viscosity from 50 to 50,000 centistokes at 40° C. (cSt).

8. Organic composition according to claim 1, wherein said composition has been subjected to a separation extraction of compounds thereof.

9. Organic composition according to claim 8, wherein the separation extraction is done by gel permeation chromatography.

10. Organic composition according to claim 8, wherein the separation extraction is done by a liquid/liquid mixture using solvents.

11. Organic composition according to claim 10, wherein the solvent is selected from the group consisting of acetone, acetonitrile, tetrahydrofuran and ethylic ether.

12. Organic composition according to claim 8, wherein the separation extraction is done by a conventional distillation or molecular short-path distillation.

13. Organic composition according to claim 8, wherein the separation extraction is done by continuous separation, by chromatography on resin according to the Simulated Moving Bead method.

14. A homopolymer glycerol polycarbonate, of the formula:

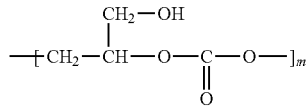

in which m is equal to at least 2, and has a value from 2 to 100.

15. A homopolymer glycerol polycarbonate extracted from an organic composition according to claim 8.

16. A polyglycerol extracted from an organic composition according to claim 8.

17. An [(α-hydroxymethyl)oxyethylene/(α-hydroxymethyl)ethylene carbonate] copolymer of the formula:

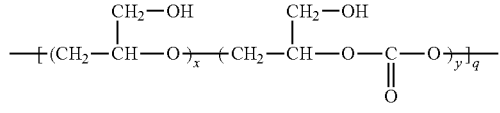

x is equal to at least 2, and has a value from 2 to 100, y is equal to at least 2, and has a value from 2 to 100, and q is equal to at least 2, and has a value from 2 to 100.

18. An [(α-alkyl)oxyethylene/(α-alkyl)ethylene carbonate] copolymer of the formula:

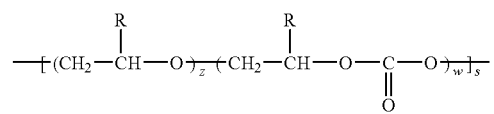

in which z is equal to at least 2, and has a value from 2 to 100, w is equal to at least 2, and has a value from 2 to 100, and s is equal to at least 2, and has a value from 2 to 100, while R is H or a $C_1$ to $C_4$ hydrocarbon chain.

19. An [(α-alkyl)oxyethylene/(α-hydroxyalkyl)oxyethylene] copolymer of the formula:

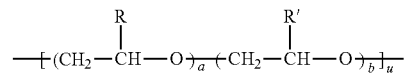

in which a is equal to at least 2, and has a value from 2 to 100, b is equal to at least 2, and has a value from 2 to 100, and u is equal to at least 2, and has a value from 2 to 100, while R is H or a $C_1$ to $C_4$ hydrocarbon chain and R' is a $C_1$ to $C_4$ hydroxylated hydrocarbon chain.

20. An [(α-hydroxymethyl)oxyethylene/(α-hydroxymethyl) ethylene carbonate] copolymer extracted from an organic composition according to claim 8.

21. An [(α-alkyl)oxyethylene/(α-alkyl)ethylene carbonate] copolymer, of which the α-alkyl is H or a hydrocarbon chain in $C_1$ to $C_4$, said polymer being extracted from an organic composition according to claim 8.

22. An [(α-alkyl)oxyethylene/(α-hydroxyalkyl)oxyethylene] copolymer of which the α-alkyl is H or hydrocarbon chain in $C_1$ to $C_4$, and of which the α-hydroxyalkyl is a $C_1$ to $C_4$ hydroxylated chain, said copolymer being extracted from an organic composition according to claim 8.

23. Method for catalytic production of an organic composition, including a glycerol carbonate, in a mixture at least one compound selected from the group consisting of polyglycerols, [(α-hydroxymethyl)oxyethylene/(α-hydroxymethyl ethylene carbonate) copolymers; [(α-alkyl)oxyethylene/(α-alkyl)ethylene carbonate] copolymers, [(α-alkyl)oxyethylene/(α-hydroxyalkyl)oxyethylene] copolymers, glycerol carbonate and/or other organic carbonates, glycerol and/or other co-produced and residual compounds, said method comprising catalytic polymerisation in a heterogeneous reaction medium comprising an organic liquid phase made up of at least one compound providing hydroxyl functions and at least one compound providing carbonate functions, a solid phase that may be solubilised, formed by a catalyst containing active sites in the Lewis and/or Bronsted sense and an ambient gaseous phase, with the reaction medium being heated, the catalytic polymerisation further comprising:
in a first step, bringing the heterogeneous reaction medium to a temperature no higher than 160° C., subjecting the reaction medium and the ambient gaseous phase to a pressure equal to at least $10^5$ Pa, while controlling the flow of gaseous or liquid reaction co-products, throughout said step,
in a second step, when the emission of $CO_2$ begins, bringing the heterogeneous reaction medium to a temperature equal to at least the final temperature of the first step, subjecting the gaseous phase containing CO2 generated in situ to a pressure equal to at least $2.5 \times 10^3$ Pa while controlling nascent gaseous emission.

24. Method for catalytic production according to claim 23, wherein compounds providing hydroxyl functions and compounds providing carbonate functions implemented in the reaction medium are present in amounts of about 0.65 to about 2.00 moles of compounds providing carbonate functions per mole of compounds providing hydroxyl functions.

25. Method for catalytic production according to claim 23, wherein the compounds providing hydroxyl functions are chosen at least one selected from the group consisting of glycerol, glycidol, glycol ethylene, the propane diols, and 2,2 dimethyl 1,3 dioxolane 4 methanol.

26. Method for catalytic production according to claim 23, wherein the compounds providing carbonate functions are at least one selected from the group consisting of urea and alkylene carbonates.

27. Method for catalytic production according to claim 23, wherein the catalytic polymerisation reaction is initiated by a direct carbonation implementing a compound providing hydroxyl functions comprising glycerol, and a compound providing carbonate functions comprising urea.

28. Method for catalytic production according to claim 23, wherein the catalytic polymerisation reaction is initiated through transcarbonation, implementing at least one compound providing hydroxyl function selected from the group consisting of glycerol, glycidol, glycol ethylene, the propane diols, and 2,2 dimethyl 1,3 dioxolane 4 methanol, and at least one compound providing carbonate function selected from the group consisting of cyclic alkylene carbonates.

29. Method for catalytic production according to claim 23, wherein the catalyst involved in the catalytic reaction is at least one metal salt selected from the group consisting of sulphates, phosphates, and nitrates.

30. Method for catalytic production according to claim 23, wherein the catalyst involved in the catalytic reaction is at least one selected from the group consisting of simple metal oxides and double metal oxides.

31. Method for catalytic production according to claim 23, wherein the catalyst implemented is selected from the group consisting of clays of the family of attapulgites zeolites of the formula:

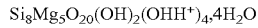

$Si_8Mg_5O_{20}(OH)_2(OHH^+)_4, 4H_2O$ in which the magnesium can be entirely or partially replaced by aluminium, said clays being metal oxide complexes with metal base functions.

32. Method for catalytic production according to claim 23, wherein the catalyst is selected from the group consisting of sodium hydroxide, potassium hydroxide, supported amines, metal alcoholates, sodium methylate or ethylate, and glycerol.

33. Method for catalytic production according to claim 23, wherein the catalyst is an ion exchanging resin selected from the group consisting of cationic resins to which metals bind and hydroxylated or bicarbonated anionic macroporous resins.

34. Method for catalytic production according to claim 23, wherein the catalyst is an organometallic compound.

35. Method for catalytic production according to claim 23, wherein the catalyst is introduced into the reaction medium in an amount of from 0.01% by weight to 5% by weight with respect to the compound providing hydroxyl functions added to the reaction medium.

36. Method for catalytic production according to claim 23, wherein the pressure applied to the reaction medium during the first step is from $2.10^2$ to $5.10^4$ Pa.

37. Method for catalytic production according to claim 23, wherein the pressure applied to the reaction medium during the first step is from $2.5 \times 10^3$ to $2.5 \times 10^6$ Pa.

38. Method for catalytic production according to claim 23, wherein the temperature to which the reaction medium is brought during the second step is equal to at least the final temperature of the first step and/or is in the range of from 180° C. to 220° C.

39. An organic composition according to claim 1 that has been employed as an ingredient in a lubricant and/or as a lubricant additive of a hydraulic fluid.

40. A composition of claim 39 wherein said lubricant and/or additive comprises a fire-resistant, lubricating agent, an industrial lubricant, a lubricant for metal working and deformation, a mould-release agent, a wood treatment and decoration product, a fire-resistant compound, a fireproofing compound, a detergent, a wetting additive, a thickener and dispersing agent, a petroleum exploration and production compound, a water treatment compound, a cosmetics compound, and/or a pharmacy, food and/or chemical intermediate.

* * * * *